(12) United States Patent
Roberts

(10) Patent No.: US 11,860,009 B2
(45) Date of Patent: Jan. 2, 2024

(54) AUTOMATED MEASURING SYSTEM FOR METER TEST BENCH

(71) Applicant: THE FORD METER BOX COMPANY, INC., Wabash, IN (US)

(72) Inventor: Peter Roberts, Rochester, IN (US)

(73) Assignee: The Ford Meter Box Company, Inc., Wabash, IN (US)

( * ) Notice: Subject to any disclaimer, the term of this patent is extended or adjusted under 35 U.S.C. 154(b) by 586 days.

(21) Appl. No.: 16/892,402

(22) Filed: Jun. 4, 2020

(65) Prior Publication Data

US 2020/0386589 A1 Dec. 10, 2020

Related U.S. Application Data

(60) Provisional application No. 62/858,456, filed on Jun. 7, 2019.

(51) Int. Cl.
| | |
|---|---|
| *G01F 1/26* | (2006.01) |
| *G05D 7/06* | (2006.01) |
| *G01F 25/10* | (2022.01) |
| *G01F 15/00* | (2006.01) |
| *F16K 47/02* | (2006.01) |
| *G01F 1/12* | (2006.01) |

(52) U.S. Cl.
CPC .............. *G01F 1/26* (2013.01); *F16K 47/023* (2013.01); *G01F 1/125* (2013.01); *G01F 15/00* (2013.01); *G01F 25/13* (2022.01); *G05D 7/0635* (2013.01)

(58) Field of Classification Search
CPC .......... G01F 25/00; G01F 21/10; G01F 25/14; G01F 15/001; G05D 7/0635
See application file for complete search history.

(56) References Cited

U.S. PATENT DOCUMENTS

| | | | | |
|---|---|---|---|---|
| 3,888,106 | A | * | 6/1975 | Last .................. G01F 25/17 73/1.27 |
| 5,574,229 | A | | 11/1996 | Castillo |
| 9,876,692 | B2 | | 1/2018 | Lai |

(Continued)

FOREIGN PATENT DOCUMENTS

| | | |
|---|---|---|
| CN | 101408452 A | 4/2009 |
| CN | 202166907 U | 3/2012 |

(Continued)

OTHER PUBLICATIONS

Automated Measuring System Product Improvement; Ford Meter Box Company, Inc. AMS II; Dated May 2010.

(Continued)

*Primary Examiner* — Erika J. Villaluna
(74) *Attorney, Agent, or Firm* — Barnes & Thornburg LLP

(57) ABSTRACT

An automated meter testing system that includes a fluid inlet valve fluidly coupled both to a fluid source and an inlet on the at least one meter. The fluid source provides fluid pressure to move fluid through the at least one meter. A flow control valve is fluidly coupled to the at least one meter opposite the fluid inlet valve. A valve controller that operates the flow control valve. A controller is electrically connected to the valve controller. The controller sends at least one signal to the valve controller to incrementally open or restrict the flow control valve to increase or decrease a flow rate of the fluid through the at least one meter.

11 Claims, 3 Drawing Sheets

(56) References Cited

U.S. PATENT DOCUMENTS

| | | | |
|---|---|---|---|
| 9,891,089 B2 | 2/2018 | Salser et al. | |
| 9,898,089 B2 | 2/2018 | Subramanian et al. | |
| 2014/0020449 A1* | 1/2014 | Ito | G01F 15/002 |
| | | | 73/30.02 |
| 2018/0188101 A1* | 7/2018 | Weindl | G01F 25/14 |
| 2019/0107850 A1* | 4/2019 | Kobayashi | G06F 9/38 |
| 2019/0137321 A1 | 5/2019 | Mastic et al. | |

FOREIGN PATENT DOCUMENTS

| | | |
|---|---|---|
| CN | 202393466 U | 9/2012 |
| CN | 202453053 U | 9/2012 |
| CN | 105953870 A | 9/2016 |
| CN | 205826079 U | 12/2016 |
| CN | 106525205 A | 3/2017 |
| CN | 106643988 A | 5/2017 |
| KR | 101540247 B1 | 8/2015 |

OTHER PUBLICATIONS

Automated Measuring System Product Improvement; Ford Meter Box Company, Inc. AMS; Dated Dec. 2018.
Ford AMS (Automated Measuring System); Dated Mar. 2003.
Automated Measuring System Product Improvement; Ford Meter Box Company, Inc. AMS; Dated Jul. 2012.
Configuration Setup-Document Revision 001-Version:1; Dated Mar. 25, 2013.
Meter Testing-AMSII Revision 001-Version: 1; Dated Mar. 25, 2013.
Shanghai Powoo Industry Co., Ltd; Automatic Water Meter Test Bench.
Ti Sales; Ford Test Benches; Donna Tamburrini.

* cited by examiner

AUTOMATED MEASURING SYSTEM FOR METER TEST BENCH

RELATED APPLICATIONS

The present application relates to and claims priority to U.S. Provisional Patent Application, Ser. No. 62/858,456, filed on Jun. 7, 2019. The subject matter disclosed in that Provisional Application is hereby expressly incorporated into the present application.

TECHNICAL FIELD AND SUMMARY

The present disclosure is directed to fluid meter test bench assemblies, and particularly to an automated meter testing system for such fluid meter test bench assemblies.

Fluid meters, such as water meters, are known devices that determine the volume of fluid passing through the meter. Most business and residential dwellings that have water service provided thereto, include a meter so the amount of water used in the dwelling can be determined. This is primarily used for billing purposes by the water provider.

A critical aspect of such fluid meters (e.g., water meters) are their accuracy. Being able to determine the correct flow rate of fluid, such as water passing through the meter, ensures the accuracy of the amount of water being used, and thus the amount of money to be charged to a customer. Because fluid meters can have a long life cycle, having a testing program to determine their consistent accuracy is an important component to sustain their long-term use.

Both flow meter operation and testing methodologies have long been known. The flow measurement is essentially the measured velocity of flow (typically feet per second) multiplied by the inside cross-sectional area of the pipe. There are many flow meter mechanisms, such as displacement, turbine, venture, ultrasonic, and others that effectively determine the amount of water passing through the meter. Because it is important for the meter to read accurately during its life, the meter needs to be periodically tested. To do this, the meter is fluidly coupled to a "test bench" assembly where a known volume of water is passed through the meter. The meter is then read. If the meter reads the same amount as the known passed volume, the meter is reading accurately. If the meter reads either less or more, it is creating some percentage error.

As known in the art, meter accuracy may be defined as the quotient obtained by dividing a quantity of fluid registered during a test by the actual volume of fluid passed through the meter. For example, a meter registering nine gallons when 10 gallons passes through it has an accuracy of $9/10$, or 90%. A meter registering 51 cubic feet on an actual volume of 50 cubic feet is $51/50$, or 102% accurate. Meter accuracy may also be expressed in percentage, fast or slow. For example, a meter that records 95 gallons when 100 gallons are run through it, under-registers or is slow by 5%. Conversely, a meter registering 102 gallons on the same volume is 2% fast. In other words, these meters run 95% and 102%, respectively.

Because most dwellings that have water service include such meters, a large number of meters may need to be tested. It is, therefore, most convenient to test multiple meters at one time. To that end, a water meter test bench is known in the art where a plurality of meters are fluidly connected together in a series on a bench (hence the name). Typically, multiple meters are tested on the bench at one time. This is accomplished by first clamping each meter to the bench and fluidly connecting the meters in a series. The meters are thus, in fluid communication with a water source and a water outlet. The bench has a flow inlet fluidly coupled to the first of the water meters at the inlet side. Air is purged from the meters by flowing water though all the meters at the inlet side. At this point, water fills all the meters between the test bench inlet and the meters' outlet. Thereafter, each tested meter is read to determine its starting point. The outlet on the bench is then opened to move the water through each meter. The water exits the last meter and deposits into a tank. At the end of the test, the flow of the meters are read again. The weight of fluid in the tank is measured to calculate the volume of fluid that has passed through the meters. That calculated volume is then compared to flow readings calculated by comparing the initial and final readings of each meter. This determines each meter's accuracy.

Traditionally, several of these functions of the water meter test bench are manually controlled, such as the flow control of water passing through the meters, manually opening and closing the row selection valves to direct water flow, opening and closing the inlet valve to allow water to flow, and determining the volume of fluid that entered the tank. This may cause potential errors such as misreading the tank level due to parallax created by a difference in peoples' height, for example. Not providing temperature correction and lack of repeatability in multiple tests may also create issues. American Water Works Association (AWWA) testing specifies the criteria for each meter type and size. Each meter type is believed to have a different accuracy range and flow rate setting for each test.

Accordingly, an illustrative embodiment of the present disclosure provides an automated meter testing system comprising: a bench sized to support at least one meter; a fluid inlet valve fluidly coupled both to a fluid source and an inlet on the at least one meter; wherein the fluid source provides fluid pressure to move fluid through the at least one meter; a flow control valve fluidly coupled to the at least one meter opposite the fluid inlet valve; a valve controller that operates the flow control valve; wherein the flow control valve is at an outflow side of the at least one meter; a discharge pipe fluidly coupled to an outflow side of the flow control valve to receive the fluid that passes through the at least one meter; a tank that receives and collects the fluid from the discharge pipe; a scale that weighs the fluid collected in the tank; a thermocouple in contact with the fluid in the tank to determine the temperature of the fluid in the tank; and a controller electrically connected to the valve controller, the fluid inlet, the scale, and the thermocouple; wherein the controller sends at least one signal to the fluid inlet valve to open or close same to supply or stop a flow of the fluid into the at least one meter; and wherein the controller sends at least one signal to the valve controller to incrementally open or restrict the flow control valve to increase or decrease a flow rate of the fluid through the at least one meter.

In the above and other illustrative embodiments, the automated meter testing system may further comprise: an interface in electrical communication with the controller; a memory in electrical communication with the controller, wherein the memory stores data selected from the group consisting of at least one of testing parameters of standardized waterworks tests, custom test parameters, flow rates, positioning of the flow control valve, meter identifications, beginning and end flow meter readings, variable testing sequences, and test results; the one or more meter tests are controlled through the interface and operated by the controller; the interface being a monitor screen; the at least one meter is a plurality of meters, wherein each of the plurality of meters are fluidly connected to each other, wherein the fluid source provides fluid pressure to move the fluid through the each of the plurality of meters, wherein the fluid source provides the fluid pressure to move the fluid through the first of the plurality of meters, and wherein the flow control valve being fluidly coupled to the last of the plurality of meters opposite the fluid inlet valve; the flow control valve being a V-ball valve; the flow control valve being selectively movable to adjust the flow rate of the fluid that passes through the at least one meter; the controller being a programmable logic controller; the valve controller being a proportional integral derivative controller; and a power supply to provide power to the automated meter testing system.

Another illustrative embodiment of the present disclosure provides an automated method of performing a water meter test, the method comprises the steps of: fluidly connecting at least one meter to a fluid inlet valve and a flow control valve, wherein the fluid inlet valve is also fluidly connected to a fluid source and the flow control valve is fluidly coupled to the at least one meter opposite the fluid inlet valve, wherein a valve controller operates the flow control valve, a controller electrically connected to the fluid inlet valve, the valve controller, and an interface electrically connected to the controller; fluidly connecting the flow control valve to a discharge pipe and a tank; registering an identity of the at least one meter into the interface; setting test parameters in the controller; purging any air that exists between the fluid inlet valve and the flow control valve, and in the at least one meter; opening the fluid inlet valve by the controller; replacing the air, between the fluid inlet valve and the flow control valve, and in the at least one meter, with a fluid; dispensing the fluid from the fluid source through the fluid inlet valve, the at least one meter, and the flow control valve; setting the flow control valve by the controller to a selective open position so that as the fluid passes through the fluid inlet valve and the at least one meter, the flow control valve is open only to the extent to correspond to a designated flow based on the test parameters; depositing the fluid from the flow control valve into a tank; recording an initial flow rate meter reading of the at least one meter; monitoring by the controller the weight of fluid deposited into the tank; monitoring by the controller the flow rate of fluid passing through flow control valve and volume of fluid in tank; comparing the flow rate determined by the controller to the designated flow rate based on the test parameters; incrementally opening or closing the flow control valve to further increase or decrease the flow rate of the fluid to match the designated flow rate within a tolerance; recording, through the interface, a final flow rate meter reading of the at least one meter; calculating, by the controller, a volume deviation based on at least one of the initial flow rate meter reading and the final flow rate meter reading.

In the above and other embodiments, the automated method of performing a water meter test may further comprise the steps of storing data from the automated method of performing the water meter test in memory electrically connected to the controller; advancing, through the controller, a subsequent automated method of performing the water meter test; repeating, through the controller, the automated method of performing the water meter test; subsequent to recording through the interface the final flow rate meter reading of the at least one meter identifying the final flow rate meter reading as the initial flow rate meter reading of a subsequent water meter test, dispensing fluid from the fluid source through the fluid inlet valve, the at least one meter, and the flow control valve, adjusting the flow control valve to correspond to a subsequent flow rate according to test parameters of the subsequent water meter test; the parameters are selected from the group consisting of at least one of a flow rate and valve position per flow rate; and monitoring by the controller the flow rate of fluid passing through the flow control valve further comprises the steps of weighing the fluid collected in the tank, calculating a current flow rate based on the weight of the fluid collected in the tank and the designated flow rate, and adjusting the current flow rate to the designated flow rate within a tolerance.

Another illustrative embodiment of the present disclosure provides an automated meter testing system comprising: a fluid inlet valve fluidly coupled both to a fluid source and an inlet on the at least one meter; wherein the fluid source provides fluid pressure to move fluid through the at least one meter; a flow control valve fluidly coupled to the at least one meter opposite the fluid inlet valve; a valve controller that operates the flow control valve; a controller electrically connected to the valve controller; wherein the controller sends at least one signal to the valve controller to incrementally open or restrict the flow control valve to increase or decrease a flow rate of the fluid through the at least one meter.

Another illustrative embodiment of the present disclosure provides an automated method of performing a water meter test, the method comprises the steps of: fluidly connecting at least one meter to a fluid inlet valve and a flow control valve, wherein the fluid inlet valve is also fluidly connected to a fluid source and the flow control valve is fluidly coupled to the at least one meter opposite the fluid inlet valve, wherein a valve controller operates the flow control valve, a controller electrically connected to the fluid inlet valve and the flow control valve; setting test parameters in the controller; opening the fluid inlet valve by the controller; dispensing fluid from the fluid source through the fluid inlet valve, the at least one meter, and the flow control valve; setting the flow control valve by the controller to a selective open position so that as the fluid passes through the fluid inlet valve and the at least one meter, the flow control valve is open only to the extent to correspond to a designated flow rate based on the test parameters; recording an initial flow rate meter reading of the at least one meter; monitoring by the controller the flow rate of fluid passing through flow control valve; comparing the flow rate determined by the controller to the designated flow rate based on the test parameters; incrementally opening or closing the flow control valve to further increase or decrease the flow rate of the fluid to match the designated flow rate within a tolerance; and recording a final flow rate meter reading of the at least one meter.

Additional features and advantages of the automated measuring system for a meter test bench will become apparent to those skilled in the art upon consideration of the following detailed descriptions of carrying out the automated measuring system for a meter test bench as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
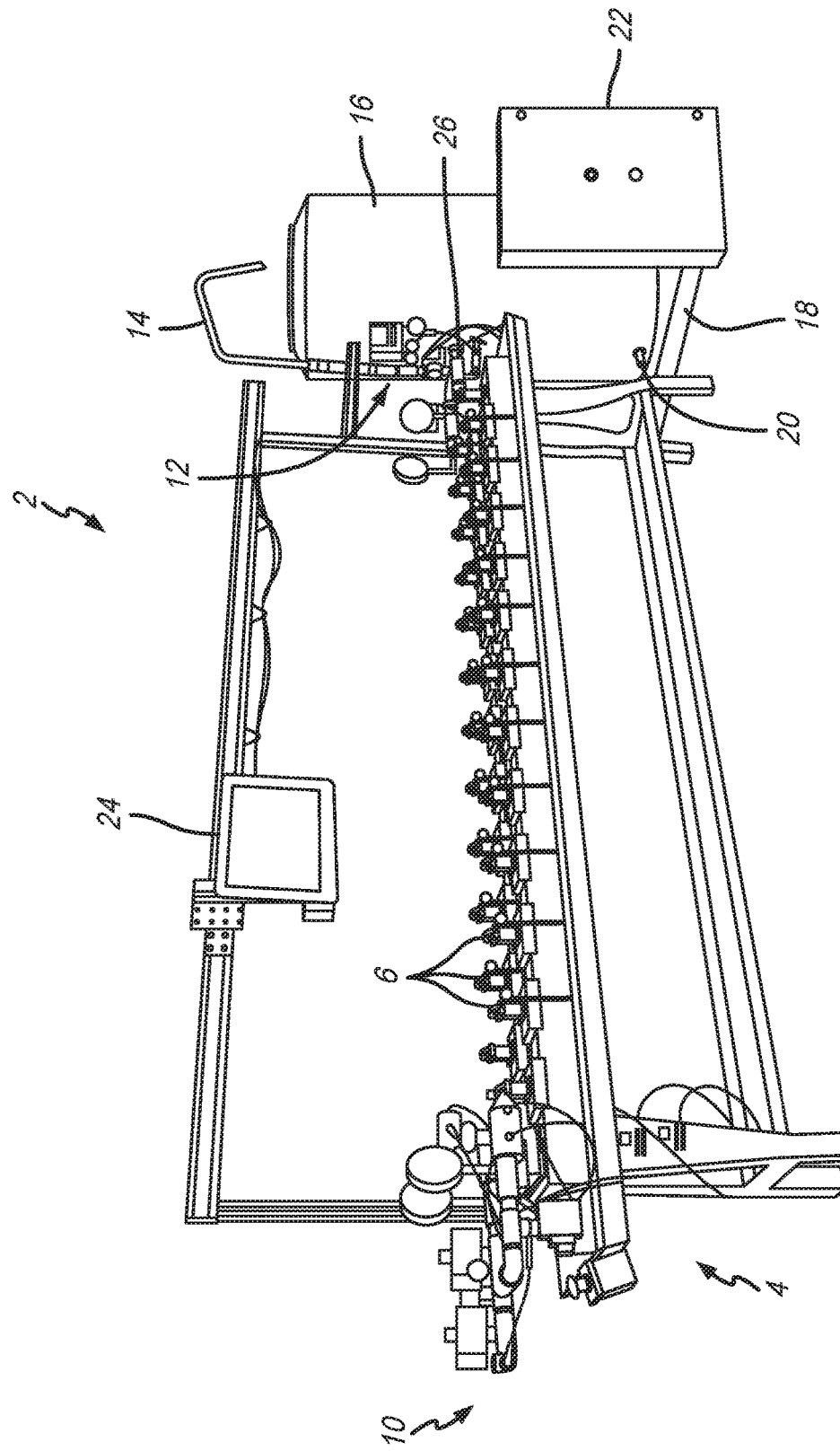
FIG. 1 is a perspective view of an automated meter testing system.

Corresponding reference characters indicate corresponding parts throughout the several views. The exemplification set out herein illustrates embodiments of the automated measuring system for a meter test bench, and such exemplification is not to be construed as limiting the scope of the automated measuring system for a meter test bench in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides an automated testing system. In particular, the automated water meter testing system may illustratively include one or more of the following features: the ability to choose multiple meter tests (e.g., AWWA test parameters and data) already stored on the system; run test per test parameters; automatic monitoring and adjusting fluid flow to ensure precise flow rate for the test volume; run additional tests without removing any meters from the bench; and store and export testing data.

Illustratively, the system includes a processor that stores test parameters (flow rates and valve position per flow rate) for any number of tests (AWWA, owner-defined tests, etc.), stores actual test results and data, runs multiple consecutive different tests, reports, and exports test results data.

Illustratively, the system may include constant flow rate monitoring and adjustment during the test. A programmable logic controller (PLC) checks the weight of the fluid that exits the meter(s) in addition to flow rate. This is to ensure a precise flow rate of water passing through the meter(s). The PLC periodically (about every few seconds) detects the weight of the water in the tank to calculate a precise flow rate passing through the meters. Temperature correction is done at the end of the test after the volume of water has been ran to completion. At that point, part of the math that is being done is to convert from lbs. to gallons. The system also takes the water temperature and adjusts the volume accordingly.

The PLC will send a signal to a proportional integral derivative (PID) controller that is in electrical connection with the V-ball valve to slightly increase or decrease the flow as needed to ensure a more precise flow rate for the test. Illustratively, V-ball valve positioning and corresponding flow rate are stored in the processor so the flow rate can be changed by a known amount based on the detected flow rate.

Again, this is to create a more precise flow volume that passes through the meters. Thus, when the test has concluded, a precise known quantity of fluid passes through each of the meters. This means that when taking the final reading of each meter to calculate the volume passed, the extent to which that volume matches the volume determined by the automated system of the present disclosure is more reliable than the prior art.

Additionally, the "Test Bench Operating Instructions" document disclosed as part of the corresponding Provisional Patent Application priority document, is incorporated herein by reference.

An illustrative embodiment of the present disclosure, as shown in FIG. 1, provides a perspective view of an automated meter testing system 2 that includes a bench 4 to support a plurality of fluidly connected meters 6. Illustratively, bench 4 includes a bench top 8 upon which the plurality of meters 6 can be clamped onto and fluidly connected in series. Such meter connections are commonly known. It is appreciated that bench top 8 may be sized to support multiple rows of fluidly connected meters 6.

Fluid inlet 10 fluidly couples to a fluid source (e.g., water) and is fluidly connected to an inlet on the first meter 6 of each row of meters 6 (if testing multiple rows of meters 6). On the opposite end of the fluidly connected meters 6, at the outlet end of the last connected meter 6, is a flow control valve assembly 12. Illustratively, flow control valve assembly 12 may be a V-ball valve assembly controlled by a PID controller. The illustrative V-ball valve in flow control valve assembly 12 is movable by small amounts. This permits fine adjustments of flow rate for the fluid introduced at fluid inlet 10 and passes through the one or more meters 6. The fluid source provides the pressure that pushes the fluid through the one or more meters 6. Flow control valve assembly 12 regulates the flow rate with which fluid passes through meters 6. The PID controller receives signals that incrementally opens and closes the V-ball valve in flow control valve assembly 12. It is appreciated that other types of valves may be employed alternatively to the V-ball valve. What the V-ball valve or other like valves provide is the ability finely change the flow rate of the fluid by slightly expanding or restricting the fluid passageway—in contrast to just a full open or a full closed position. It is also noted that in this embodiment, flow control valve assembly 12 is located on the outlet side of flow meters 6 as opposed to the inlet side. It is believed this may allow for better flow rate control of the fluid that passes through meters 6.

A discharge pipe 14 is fluidly connected to the outflow side of flow control assembly 12 to receive the water that passes through meters 6. The fluid is then deposited into tank 16 that collects same. A scale 18 supports tank 16 and weighs the fluid so the flow rate and volume can be determined as a function of time. Additionally, since it is known that temperature may be a factor, a thermocouple 20 is in contact with the fluid contents of tank 16 to determine the fluid's temperature.

A controller 22 may be electrically tied to, and can send and receive signals to and from fluid inlet 10, flow control assembly 12, scale 18, and thermocouple 20. Controller 22 may include a power supply to provide power to automated meter testing system 2, as well as a PLC that operates system 2. Particularly, controller 22 may send signals to fluid inlet 10 to open and close same for supplying or stopping fluid flow to meters 6. Controller 22 may also send signals to flow control valve assembly 12 to set and incrementally open or restrict its valve to increase or decrease the flow rate based on the data controller 22 receives from scale 18. This creates a precise predetermined flow rate for the particular flowmeter test.

An interface 24, such as a computer screen, is in electrical communication with controller 22. This allows data to be entered into and perceived during the course of the test(s). One or the other, or both controller 22 and interface 24, may include memory that stores testing parameters of standardized waterworks tests, custom tests, flow rates and valve positioning for flow control valve assembly 12, meter identifications, beginning and end flow meter readings cells for any number of meters, variable consecutive testing sequence capabilities, testing results data output, and help screen with links to operation instructions. As such, a meter test or several meter tests may be controlled through interface 24 and operated and monitored through controller 22 so that the flow volume of the test(s) are as precise as possible. In other words, by accurately and precisely controlling the test volume of fluid that passes through the meters, when that volume is compared with the results of the start and end readings of the meters, those readings will be as accurate as possible.

An illustrative method of performing a water meter test may include: installing one or more meters that are to be tested in fluid communication with each other on bench top 8. The meters 6 are fluidly connected to each other, and at the inflow side of the first meter to fluid inlet 10. The fluid outlet side of the last meter 6 is fluidly connected to flow control assembly 12. This creates a fluid pathway from the fluid source through fluid inlet 10, meters 6, flow control valve assembly 12, discharge pipe 14, and finally into tank 16. This is typically done through entering each meter's serial number into interface 24. After meters 6 are securely clamped to bench top 8, air that exists between fluid inlet 10 and the outlet of the last meter 6 fluidly connected to flow control valve assembly 12 is purged from automated meter testing system 2 through blow off valve 26. Here, fluid, such as water, replaces the air so at the beginning of the test cycle, system 2 is full of fluid. This ensures that all of the multiple meters 6 will be moving fluid at the same time when the test initiates.

Through interface 24, all of the meters 6 that will be tested, are registered. With each meter 6 registered the initial flow reading of each of meters 6 will be recorded. This initial meter reading is the starting point to determine the meter's flow-reading accuracy. The desired meter reading test can be selected through interface 24. The particular parameters of each test (most tests are standardized and known) are stored in system 2 which may be chosen through interface 24. Additionally, custom tests, where a user can enter the test volume, flow rate, meter accuracy low limit, and meter accuracy high limit, for each sequence, may also be entered through interface 24. It is appreciated that such test may be saved through memory on system 2. Additionally, multiple test sequences may be run through meters 6 consecutively. The meter type and meter size can be entered if needed for either the standard or custom tests to be performed. Once all the data is entered, the meter reading test is initiated. At this point, pressure from the fluid source will cause same to push fluid through open fluid inlet 10, meters 6, and flow control valve assembly 12.

Part of the process of setting the test parameters is the PLC in controller 22 setting the V-ball valve or other precision valve of flow control valve assembly 12 to the correct position so that as fluid passes through fluid inlet 10 and meters 6, the V-ball valve is open only to the extent necessary to permit the programmed flow rate of the fluid to pass therethrough and into tank 16. The programmed flow rate is based on the particular test chosen. Once the test is initiated, the PLC in controller 22 will also monitor the volume of fluid deposited in tank 18 to determine the flow rate and volume of fluid in tank 16. This is a known calculation. If the flow rate is not the same as the designated flow rate within a tolerance for the particular test, the PLC in controller 22 will incrementally open or close the V-ball valve further to either increase or decrease the flow of fluid passing therethrough, respectively. This ensures a more precise flow rate for the designated test passing through each meter 6.

When the test has concluded, the end meter readings for each meter 6 is recorded through interface 24. When this is complete, system 2 calculates the volume deviation based on the readings compared to the precise calculated water volume. Those results can be stored in the memory of system 2, and/or output in a file format to be analyzed on another system. Additionally, system 2, through controller 22, can advance to a subsequent test and adjust the flow control valve assembly 12 as dictated by that subsequent test. Otherwise, the operation of the subsequent test, including the meter readings as previously described, will be repeated.

Figure 2:
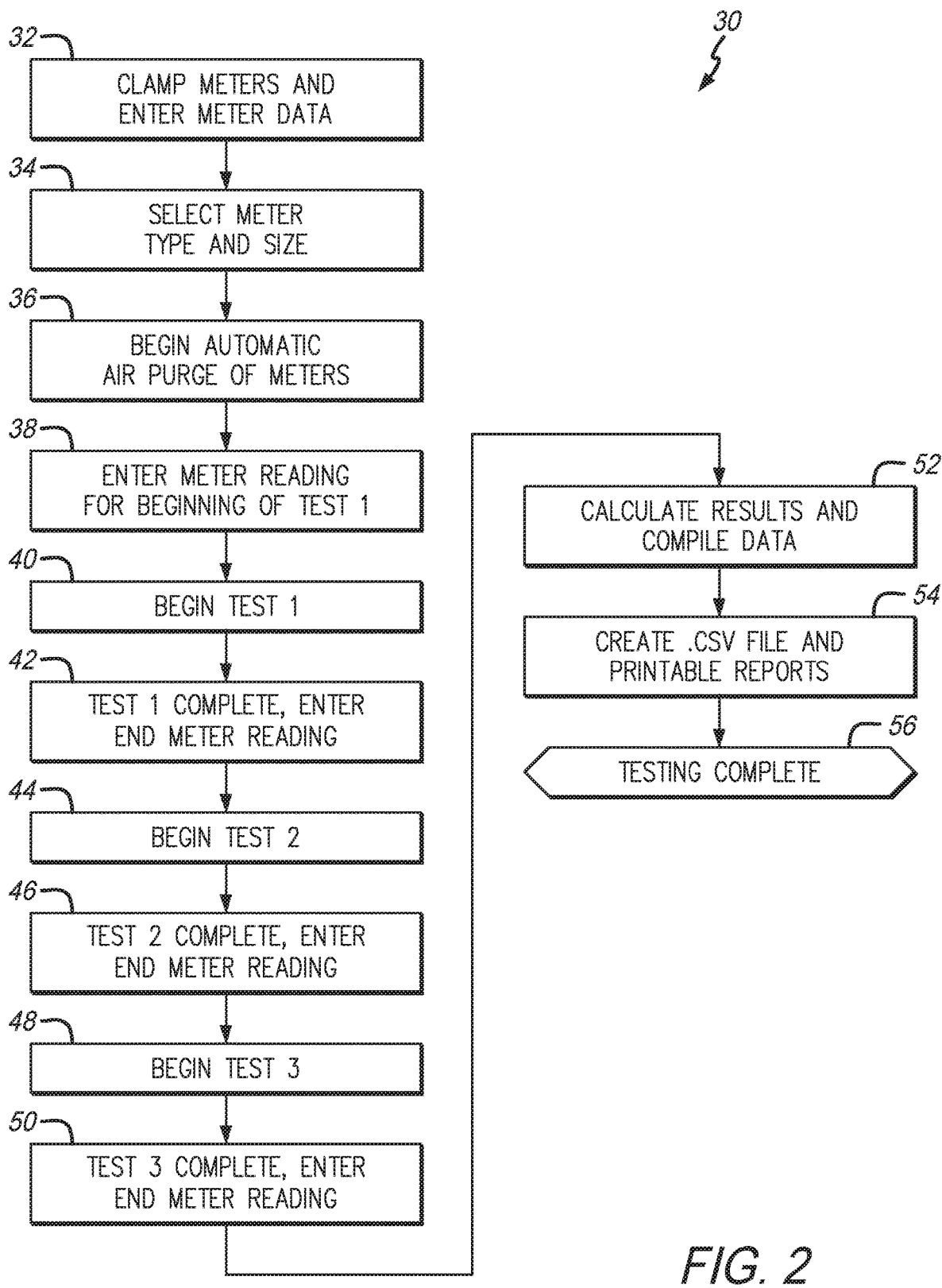
FIG. 2 is a diagrammatic flow chart depicting a meter testing sequence employing automated meter testing system of FIG. 1.

A flow chart depicting a meter testing sequence 30 employing automated meter testing system 2 from FIG. 1, is shown in FIG. 2. The illustrative meter testing sequence 30 generally commences with clamping meters 6 onto bench top 8 and entering the meter data (serial number, etc.) at 32. On interface 24, the meter type and size is selected as identified at 34. With meters 6 installed and meter data entered, the air is purged from meters 6 and replaced with fluid (e.g., water) as indicated at 36. When meters 6 are filled with water, the initial meter readings for each of the meters 6 being tested is read as indicated at 38. For purposes of this example, multiple tests may be performed in sequence. The first test herein, as identified at 38, is Test (1). After all of the readings have been taken, Test (1) can be initiated as indicated at 40. As part of the test, fluid is directed through each of meters 6 at a specific rate as defined by and input for the particular test (i.e., the valve from flow control valve assembly 12 is set to the predetermined flow rate). It is during the test that the fluid flow will be monitored and flow rate adjusted, as needed, by controller 22, pursuant to data received from scale 18, to ensure a precise flow rate. This is accomplished by opening or restricting the valve in flow control valve assembly 12. Once the designated volume of the test is reached, fluid is stopped from flowing through meters 6, thereby completing the test. At this point, the end meter reading is taken for each meter 6 tested as indicated at 42.

Because of the automated nature of system 2, a subsequent different test may be administered after the end meter readings are taken at 42. For example, with meters 6 still filled with water from Test (1), Test (2), as indicated at 44, may begin. The end meter reading of Test (1) will serve as the beginning meter reading for Test (2). During procession of Test (2), controller 22 may adjust the flow control valve assembly at 42 based on data received from scale 18 to ensure precision to the designated flow rate for Test (2). In most cases, the designated test flow rate for Test (2) may be different than the flow rate for Test (1). The valve from flow control valve assembly 12 will be adjusted to correspond to the designated flow rate of Test (2). When the designated volume for Test (2) has been reached, the test stops and the end meter reading for Test (2) is taken for each tested meter 6 as indicated at 46.

Automated meter testing system 2 may proceed to perform another successive test on meters 6 subsequent to Test (2). Again, because fluid is still present in meters 6, Test (3) (which may be different than either Test (1) or Test (2)) may be initiated at 48. The valve from flow control valve assembly 12 will be adjusted to correspond to the designated flow rate of Test (3). Similar to the beginning of Test (2), the end meter reading from Test (2) will now serve as the initial meter readings for Test (3). And again, controller 22, receiving data from scale 18, may send signals to flow control valve assembly 12 to either incrementally open or close same to maintain the designated flow rate for Test (3). It is appreciated that this flow rate may be different than either flow rates designated for Test (1) or Test (2). At the end of Test (3), the end meter readings are taken at 50. Data from all three tests are used by system 2 to calculate the accuracy of the meter readings of each of meters 6. Those results are compiled as indicated at 52. The results may also be compiled to a useful format such as a .CSV file that can be imported into Microsoft Excel®, or the results can be printed as reports directly from system 2 as indicated at 54. Subsequently, the testing may be deemed complete as indicated at 56.

Figure 3:
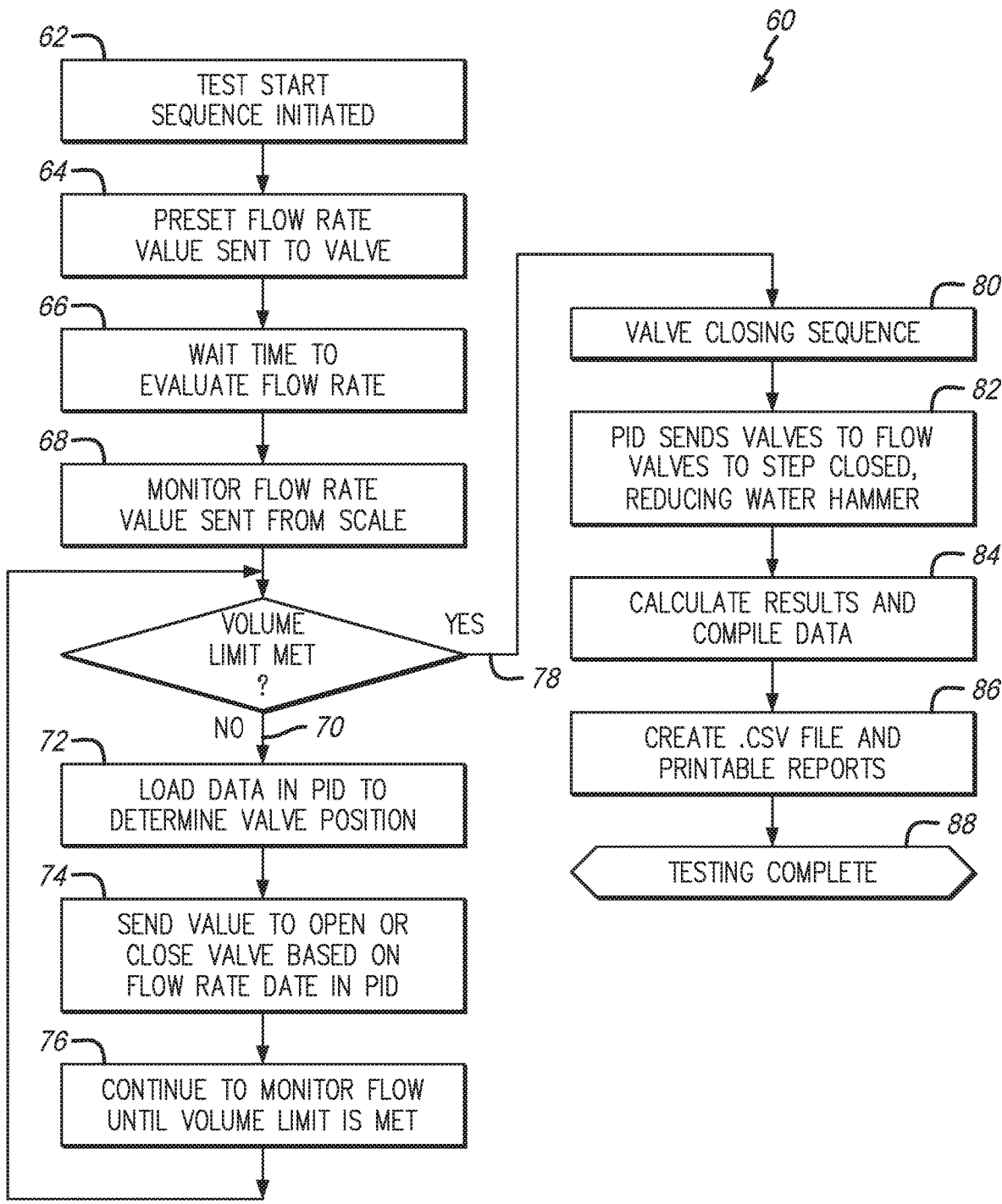
FIG. 3 is depicts a process of how the automated meter testing system monitors fluid flow.

As also indicated above, controller 22 monitors the flow that is generated through fluid inlet 10 and controlled by flow control valve assembly 22 to ensure that it matches the designated flow rate for the particular test. The diagram in FIG. 3 shows how process 60 of assembly 2 monitors fluid flow. Once the test starts this process 60 is initiated as indicated at 62. A preset flow rate value is sent to flow control valve assembly 12 as indicated at 64. Here, as identified previously, preset valve settings that correspond to known flow rates can be stored in the memory of assembly 2. So, for example, if a test has a particular flow rate standard, the flow control valve assembly 12 is opened an amount that corresponds to that flow rate. The presumption is that the fluid flowing from fluid inlet 10, through meters 6, and flow control assembly 12, will flow at the rate assigned to flow control valve assembly 12. Indeed, when the test starts, process 60 waits to evaluate the flow rate as indicated at 66, to see if that is the case. After a period of time (illustratively about 10 seconds), controller 22 monitors the flow rate by monitoring the flow rate value set sent from scale 18 at 68. From that data, controller 22 determines whether the volume limit for the test has been met. If the volume limit has not been met as indicated at 70, data from controller 22 is loaded into the PID to determine valve position as indicated at 72. A signal is then sent to open or restrict the valve of flow control valve assembly 12, to some extent, based on the flow rate data in the PID as indicated at 74. The flow rate is repeatedly monitored and the valve in flow control valve assembly 12 is adjusted accordingly pursuant 72 and 74, as indicated by 76, until the volume limit is met.

If after data from scale 18 is monitored at 68 and found to have reached the volume limit as indicated at 78, controller 22 sends a signal to flow control valve assembly 12 to initiate a valve closing sequence as indicated at 80. The sequence includes the PID sending a signal to step close flow control valve assembly 12. This may have the effect of reducing water hammer during the end of the testing, as indicated at 82, similar to steps 52 and 54 of FIG. 2. Results are then calculated and compiled at 84, and a .CSV file or report is generated at 86 prior to testing being completed at 88.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. An automated meter testing system comprising:
   a bench sized to support at least one meter;
   a fluid inlet valve fluidly coupled both to a fluid source and an inlet on the at least one meter;
   wherein the fluid source provides fluid pressure to move fluid through the at least one meter;
   a flow control valve fluidly coupled to the at least one meter opposite the fluid inlet valve;
   a valve controller that operates the flow control valve;
   wherein the flow control valve is at an outflow side of the at least one meter;
   a discharge pipe fluidly coupled to an outflow side of the flow control valve to receive the fluid that passes through the at least one meter;
   a tank that receives and collects the fluid from the discharge pipe;
   a scale that weighs the fluid collected in the tank;
   a thermocouple in contact with the fluid in the tank to determine temperature of the fluid in the tank; and
   a controller electrically connected to the valve controller, the fluid inlet, the scale, and the thermocouple;
   wherein the controller sends at least one signal to the fluid inlet valve to open or close same to supply or stop a flow of the fluid into the at least one meter;
   wherein the controller sends at least one signal to the valve controller to incrementally open or restrict the flow control valve to increase or decrease a flow rate of the fluid through the at least one meter;
   wherein the controller determines the temperature from the thermocouple of a volume of fluid at test end when the volume of fluid has all been collected in the tank; and
   wherein the controller determines an adjusted volume of fluid at the test end based on the temperature and a weight of the volume of fluid that has all been collected in the tank.

2. The automated meter testing system of claim 1, further comprising an interface in electrical communication with the controller.

3. The automated meter testing system of claim 2, further comprising a memory in electrical communication with the controller, wherein the memory stores data selected from the group consisting of at least one of testing parameters of standardized waterworks tests, custom test parameters, flow rates, positioning of the flow control valve, meter identifications, beginning and end flow meter readings, variable testing sequences, and test results.

4. The automated meter testing system of claim 2, wherein one or more meter tests are controlled through the interface and operated by the controller.

5. The automated meter testing system of claim 1, wherein the interface is a monitor screen.

6. The automated meter testing system of claim 1, wherein the at least one meter is a plurality of meters, wherein each of the plurality of meters are fluidly connected to each other, wherein the fluid source provides the fluid pressure to move the fluid through the each of the plurality of meters, wherein the fluid source provides fluid pressure to move the fluid through the first of the plurality of meters, and wherein the flow control valve is fluidly coupled to the last of the plurality of meters opposite the fluid inlet valve.

7. The automated meter testing system of claim 1, wherein the flow control valve is a V-ball valve.

8. The automated meter testing system of claim 7, wherein the flow control valve is selectively movable to adjust the flow rate of the fluid that passes through the at least one meter.

9. The automated meter testing system of claim 1, wherein the controller includes a programmable logic controller.

10. The automated meter testing system of claim 1, wherein the valve controller is a proportional integral derivative controller.

11. The automated meter testing system of claim 1, further comprising a power supply to provide power to the automated meter testing system.

\* \* \* \* \*